Figure 1:
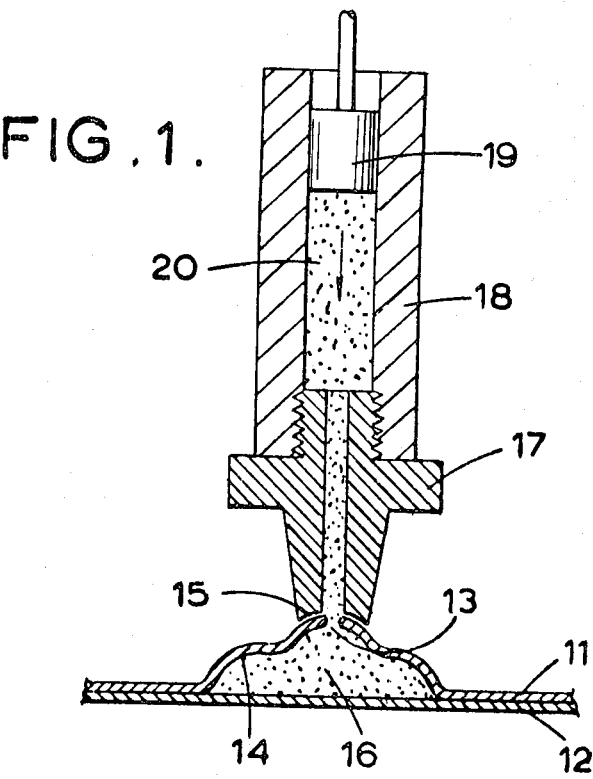

United States Patent [19]
Norman

[11] 3,902,949
[45] Sept. 2, 1975

[54] METHOD OF BONDING THE WORKPIECES TOGETHER WITH HOT-MELT ADHESIVE

[75] Inventor: Edward G. Norman, Headington, England

[73] Assignee: Pressed Steel Fisher Ltd., Oxford, England

[22] Filed: July 26, 1967

[21] Appl. No.: 656,245

[30] Foreign Application Priority Data
Aug. 15, 1966 United Kingdom............... 36452/66

[52] U.S. Cl................................. 156/252; 156/305
[51] Int. Cl............................................ B32b 31/04
[58] Field of Search............................ 156/305, 252

[56] References Cited
UNITED STATES PATENTS

| | | |
|---|---|---|
| 2,975,092 | 3/1961 | Hagerty ..................... 156/305 X |
| 3,042,572 | 7/1962 | Verhulst ...................... 156/305 X |
| 3,264,394 | 8/1966 | Gohl ............................ 264/261 X |
| 3,420,725 | 1/1969 | Curry.................................. 156/305 |

FOREIGN PATENTS OR APPLICATIONS

| | | |
|---|---|---|
| 1,303,377 | 7/1962 | France................................ 264/263 |

*Primary Examiner*—Leland A. Sebastian
*Attorney, Agent, or Firm*—Thomas J. Greer, Jr.

[57] ABSTRACT

A method of bonding two workpieces together wherein a hot-melt adhesive is injected through an aperture to fill a cavity formed between the two workpieces; the apertured cavity may be formed either by deforming a portion of at least one of the workpieces or by inserting a preformed component in a hole formed through one of the workpieces.

2 Claims, 2 Drawing Figures

METHOD OF BONDING THE WORKPIECES TOGETHER WITH HOT-MELT ADHESIVE

This invention relates to a method of bonding two workpieces together.

It is well known that workpieces may be bonded together with a hot-melt adhesive; examples of typical hot-melt adhesives are polyethelene vinyl acetate copolymer resin; nylon-phenolic compositions, polyamides and many conventional thermoplastic resins; such adhesives have the advantage of providing a strong joint that sets quickly as the adhesive cools, but the consequent disadvantage that, having coated the workpiece with such an adhesive, there is often insufficient time to manipulate the workpieces into their intended positions before the adhesive has cooled and set.

The object of this invention is to provide a method of bonding two workpieces together which overcomes the above disadvantage.

According to the invention a method of bonding two workpieces together includes the steps of holding the workpieces together in overlapping relationship, providing an apertured cavity between the adjacent surfaces of the workpieces, injecting hot-melt adhesive through the aperture to fill the cavity, and allowing the adhesive to cool.

The apertured cavity may be formed by deforming a portion of at least one workpiece, for example a depression in the surface of one workpiece may be so formed that when the workpieces are placed in overlapping relationship a cavity is formed between the depressed surface and the adjacent surface of the other workpiece: alternatively, the apertured cavity may be formed by inserting a preformed component in a hole formed in one of the workpieces, the component being adapted to prevent separation of the workpieces after bonding and being adapted to provide an apertured cavity in conjunction with the adjacent surface of the other workpiece.

Conveniently the aperture is provided with a surrounding nipple in order to locate the nozzle of an injector means, and of course, it will be understood that the nipple may be either protruding or retracted depending on the type of nozzle used.

Figure 2:
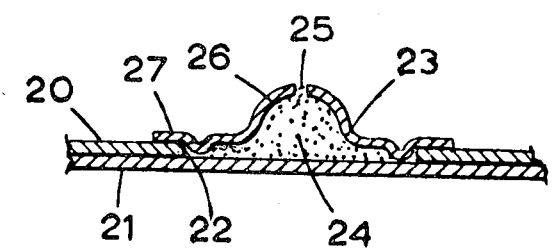

The invention will now be described, solely by way of example, with reference to the accompanying drawings in which FIG. 1 is a schematic cross-section of two workpieces being bonded, and FIG. 2 is a schematic cross-section of a further two workpieces which have been bonded.

Referring to FIG. 1, two sheet-steel workpieces 11 and 12 are prepared for bonding by deforming a portion of the workpiece 11 between suitable dies to form an aperture 13 and a depression 14, the aperture 13 being provided with a surrounding nipple 15. The workpieces 11 and 12 are then cleaned to remove any surface contamination and are held together in the overlapping relationship in which they are to be bonded with the depression 14 and the adjacent surface of the workpiece 12 forming a cavity 16.

A suitable injector which is shown as comprising a nozzle portion 17, a cylinder portion 18 and a piston 19 is fed with molten polyethelene vinyl acetate hot-melt adhesive 20, maintained at between 200° – 300°C and the nozzle portion 17 is applied to the nipple 15 formed in the workpiece 11. The piston 19 is actuated to inject a metered quantity of adhesive 20 through the aperture 13 in order to fill the cavity 16. Due to the relatively low temperature of the workpieces 11 and 12, the adhesive in the cavity 19 cools quickly and solidifies to bond the workpieces together. Thus, it should be understood that such a method of bonding is particularly suitable for forming bonds between lightly loaded brackets or the like and structural members especially in the construction of vehicle body work since the bond can be effected quickly without any marring of the exposed surface of the workpiece remote from the apertured cavity such as would occur if the workpieces were spot welded.

Whilst the means for storing and injecting hot-melt adhesive do not form part of the present invention, it should be understood that the adhesive may be stored in a lagged reservoir which is provided with thermostatically controlled electrical resistance heating means and a powered stirrer, and is connected to a source of nitrogen gas so pressurised that the adhesive can be displaced from the reservoir through a pipe lagged with an insulating jacket incorporating a resistance heating wire, and thence through a non-return valve into the cylinder of the injector means. Conveniently the injector includes a piston as described above and the piston may be actuated in known manner by pneumatic means. Alternatively the adhesive may be mechanically pumped through the injector with a timer metering the quantity required using apparatus similar to that customarily used for hot-melt adhesive bead and spray application. Furthermore in some cases it will be found convenient to dispense with the reservoir and simply use a hand gun which incorporates a cartridge of hot-melt adhesive.

Referring now to FIG. 2, it will be appreciated that the deformation of a portion of the workpiece required in the above example may be easily effected when the workpiece comprises a deformable metallic or mouldable plastics material, but that in other cases it may prove difficult or indeed impossible. Hence in a modification of the invention an apertured cavity is formed between workpieces 20 and 21 by forming a hole 22 through the workpiece 20 and inserting through the hole 22 preformed component 23 which is shaped to form the required cavity 24 and which is provided with an aperture 25 and preferably a surrounding nipple 26. The component 23 shown in FIG. 2 of the accompanying drawings incorporates a flange 27 which serves to prevent separation of the workpieces 20 and 21 after bonding, but of course such a preformed component may be adapted to prevent separation of the sheets in many other ways, which will readily occur to those skilled in the art. A preformed component, such as 23, may conveniently be formed as a metal stamping or as a synthetic plastics moulding.

Whilst the invention has been described with reference to examples of methods of bonding sheet-like workpieces, it will of course be understood that the invention is easily applicable to thick workpieces wherein an apertured cavity can be formed between the adjacent surfaces of the workpieces by, for example, a machining or moulding operation.

I claim:

1. A method of joining two sheet workpieces together in overlapping relationship comprising the steps of
   a. forming an apertured bulge in a first sheet workpiece, b. placing a second sheet workpiece in abutting overlapping relationship to the first workpiece, with the interior surface of said bulge in the first workpiece and an opposite face of the second workpiece jointly defining a discrete apertured cavity formed between the workpieces, c. injecting a hot melt adhesive through said aperture into said cavity to thereby fill the cavity, d. allowing the adhesive to cool and harden, e. said bulge formed by forming a hole in said workpiece and inserting a preformed bulged apertured component over said hole and in engagement with the outer periphery thereof.

2. The method of claim 1 wherein said preformed component is formed to provide a nipple surrounding said aperture.

* * * * *